(12) United States Patent
Hogyoku (10) Patent No.: US 7,260,376 B2
(45) Date of Patent: Aug. 21, 2007

(54) ANTENNA GAIN SPECIFYING DEVICE AND RADIO COMMUNICATION DEVICE

(75) Inventor: Itaru Hogyoku, Kashihara (JP)

(73) Assignee: Sharp Kabushiki Kaisha, Osaka (JP)

( * ) Notice: Subject to any disclaimer, the term of this patent is extended or adjusted under 35 U.S.C. 154(b) by 344 days.

(21) Appl. No.: 10/793,872

(22) Filed: Mar. 8, 2004

(65) Prior Publication Data

US 2004/0214595 A1 Oct. 28, 2004

(30) Foreign Application Priority Data

Apr. 24, 2003 (JP) ............................ 2003-120057

(51) Int. Cl.
*H04B 1/06* (2006.01)
(52) U.S. Cl. .............................. 455/277.1; 455/562.1; 455/561
(58) Field of Classification Search ................ 455/561, 455/562.1, 277.1, 277.2, 67.11, 67.12, 67.13
See application file for complete search history.

(56) References Cited

U.S. PATENT DOCUMENTS

| | | | | |
|---|---|---|---|---|
| 5,691,729 A * | 11/1997 | Gutman et al. | .......... | 455/277.2 |
| 5,691,730 A * | 11/1997 | Egashira et al. | ............ | 343/702 |
| 6,195,045 B1 * | 2/2001 | Xu et al. | ..................... | 342/368 |
| 6,226,507 B1 | 5/2001 | Ramesh et al. | .......... | 455/277.1 |
| 6,404,387 B1 * | 6/2002 | Kihira et al. | ................ | 342/378 |
| 6,477,359 B2 * | 11/2002 | Heppe et al. | ............. | 455/277.2 |
| 6,934,541 B2 * | 8/2005 | Miyatani | ................. | 455/67.11 |
| 2001/0045907 A1 * | 11/2001 | Rexberg | ..................... | 342/368 |
| 2001/0052879 A1 * | 12/2001 | Gunee et al. | ............... | 343/702 |

FOREIGN PATENT DOCUMENTS

| | | |
|---|---|---|
| CN | 1289487 A | 3/2001 |
| JP | 9-148973 | 6/1997 |
| JP | 2000-151318 | 5/2000 |

OTHER PUBLICATIONS

Shunyou et al. "Studies of Test Field Effects on Large Circular Aperture Antenna Gain Measurement"; Journal of China Institute of Communications, vol. 15, No. 5, Sep. 1994; pp. 88-93. (partial translation).

* cited by examiner

*Primary Examiner*—Lana Le
(74) *Attorney, Agent, or Firm*—Nixon & Vanderhye, PC (57) ABSTRACT

A radio communication device capable of specifying an arbitrary antenna gain even when an antenna having such an arbitrary antenna gain is connected is configured as follows. The radio communication device includes: a first connector for connecting a first antenna having any given antenna gain; a second antenna having a known antenna gain; a reception circuit receiving radio waves; and a control circuit that specifies a relative antenna gain of the first antenna with respect to the second antenna using a first intensity of radio waves received by the reception circuit using the first antenna connected to the first connector and a second intensity of radio waves received by the reception circuit using the second antenna, and controls the reception circuit based on a third intensity of radio waves corrected from the first intensity of radio waves based on the relative antenna gain.

4 Claims, 6 Drawing Sheets

FIG.6

ANTENNA GAIN SPECIFYING DEVICE AND RADIO COMMUNICATION DEVICE

This nonprovisional application is based on Japanese Patent Application No. 2003-120057 filed with the Japan Patent Office on Apr. 24, 2003, the entire contents of which are hereby incorporated by reference.

BACKGROUND OF THE INVENTION

1. Field of the Invention

The present invention relates to an antenna gain specifying device and a radio communication device, and more particularly to an antenna gain specifying device and a radio communication device capable of appropriately calculating an antenna gain.

2. Description of the Background Art

Conventionally, an apparatus for communicating signals by radio waves has an antenna attached thereto so that antenna power in transmission can be increased by an antenna gain. In reception, such an apparatus operates as if a receiver sensitivity was apparently increased by the antenna gain. As a result, the apparatus can receive a weaker signal. By making use of this phenomenon, devices that control such an apparatus in various ways have been developed.

Specifically, Japanese Patent Laying-Open No. 9-148973 discloses a diversity reception device for selecting an antenna receiving radio waves with the highest intensity by integrating or averaging multiple values representing intensities of received radio waves. Furthermore, Japanese Patent Laying-Open No. 2000-151318 discloses a peripheral level detecting device in which a time constant is changed, based on whether a peripheral level signal specified by a radio wave received by an antenna is synchronized with a radio signal, in order to improve accuracy of detecting received field intensity.

However, in the case where an antenna is selected by integrating or averaging multiple values representing intensities of received radio waves, as disclosed in Japanese Patent Laying-Open No. 9-148973, an antenna with radio waves having the actually highest intensity may not be selected. This problem arises in a radio apparatus to/from which an external antenna can be attached/removed using an external connector.

Such an apparatus can be provided with any antenna if the shape of the external connector fits. This is very convenient to apparatus-users since they can use any antenna. On the other hand, to apparatus-designers, this may result in that an arbitrary antenna, that is, an unspecific antenna having an arbitrary antenna gain will be attached.

When an arbitrary antenna is attached, it becomes impossible to develop accurate gain designs. In particular, in the case of an apparatus sensing carriers by measuring a magnitude of a signal level using an antenna terminal, a signal level appearing at the antenna terminal varies depending on a gain of an antenna as attached. Varied signal levels make it impossible to determine a signal level accurately. Therefore, a proper operation cannot be ensured.

In order to solve this problem, the apparatus having the aforementioned problem has been actually configured such that only an antenna having a known antenna gain can be used, even though an arbitrary antenna can be attached in nature. Such an apparatus is configured to operate properly according to the following method when an antenna is to be replaced. Specifically, that method includes setting the gain of the attached antenna by operating a switch or the like as separately provided.

The aforementioned problem is especially significant for an apparatus having an antenna diversity function to allow antennas to be used in a switched manner. This is because, in the structure in which a plurality of antennas can be externally attached, all the gains of a plurality of antennas to be attached may be different. Such an apparatus cannot ensure a proper operation when the antennas are switched over by the diversity function. In order to solve such a problem, an antenna gain must be individually set for each of the connected antennas. This operation is too complicated to be put into practical use.

The similar problem as described above arises in the case where a time constant is changed based on whether a peripheral level signal specified by a received radio wave is synchronized with a radio signal, as disclosed in Japanese Patent Laying-Open No. 2000-151318.

SUMMARY OF THE INVENTION

The present invention is made to solve the aforementioned problem. An object of the present invention is to provide an antenna gain specifying device and a radio communication device capable of specifying an arbitrary antenna gain even when an antenna having such an arbitrary antenna gain is connected thereto.

In order to achieve the aforementioned object, an antenna gain specifying device in accordance with one aspect of the present invention includes: connecting means for connecting a first antenna having any given antenna gain; a second antenna having a known antenna gain; receiving means for receiving radio waves using an antenna; and specifying means for specifying a relative antenna gain of the first antenna with respect to the second antenna using a first intensity of radio waves received by the receiving means using the first antenna connected to the connecting means and a second intensity of radio waves received by the receiving means using the second antenna.

More specifically, the connecting means connects the first antenna having any given antenna gain. The second antenna has a known antenna gain. The receiving means receives radio waves using an antenna. The specifying means can thus specify a relative antenna gain of the first antenna with respect to the second antenna using a first intensity of radio waves received by the receiving means using the first antenna connected to the connecting means and a second intensity of radio waves received by the receiving means using the second antenna. As a result, even when an antenna having any given antenna gain is connected, the antenna gain specifying device can specify such an antenna gain.

Preferably, the second antenna is a fixed antenna.

More specifically, the second antenna may be a fixed antenna. The specifying means can thus specify the relative antenna gain of the first antenna as a fixed value with respect to the antenna gain of the second antenna. As a result, even when an antenna having any given antenna gain is connected, the antenna gain specifying device can specify such an antenna gain.

Preferably, the connecting means includes means for connecting a plurality of the first antennas. Preferably, the antenna gain specifying device further includes selecting means for selecting any one of the plurality of first antennas based on an intensity of radio waves received by the plurality of first antennas. Preferably, the receiving means includes means for receiving radio waves using any one of the plurality of first antennas that is selected by the selecting means.

More specifically, the connecting means can connect a plurality of first antennas. The selecting means can select any one of a plurality of first antennas based on the intensity of radio waves received by a plurality of first antennas. The receiving means can receive radio waves using any one of a plurality of first antennas that is selected by the selecting means. The specifying means can thus specify a relative antenna gain of any of a plurality of first antennas with respect to the second antenna. As a result, even when a plurality of antennas having any given antenna gains are connected, the antenna gain specifying device can specify an antenna gain of any one of a plurality of antennas.

Preferably, the specifying means includes calculation means for calculating the relative antenna gain based on an intensity difference between the first intensity of radio waves and the second intensity of radio waves.

More specifically, the calculation means can calculate the relative antenna gain based on an intensity difference between the first intensity of radio waves and the second intensity of radio waves. Thus, the calculation means can specify the relative antenna gain more easily. As a result, even when an antenna having any given antenna gain is connected, the antenna gain specifying device can easily specify such an antenna gain.

Alternatively, the calculation means preferably includes means for calculating the intensity difference as the relative antenna gain.

More specifically, the calculation means can calculate the intensity difference as the relative antenna gain. Therefore, the calculation means can specify a relative antenna gain more easily. As a result, even when an antenna having any given antenna gain is connected, the antenna gain specifying device can specify such an antenna gain more easily.

In accordance with another aspect of the present invention, a radio communication device includes: connecting means for connecting a first antenna having any given antenna gain; a second antenna having a known antenna gain; receiving means for receiving radio waves using an antenna; specifying means for specifying a relative antenna gain of the first antenna with respect to the second antenna using a first intensity of radio waves received by the receiving means using the first antenna connected to the connecting means and a second intensity of radio waves received by the receiving means using the second antenna; and control means for controlling the receiving means based on a third intensity of radio waves that is corrected from the first intensity of radio waves based on the relative antenna gain.

More specifically, the connecting means connects the first antenna having any given antenna gain. The second antenna has a known antenna gain. The receiving means receives radio waves using an antenna. The specifying means specifies a relative antenna gain of the first antenna with respect to the second antenna using a first intensity of radio waves received by the receiving means using the first antenna connected to the connecting means and a second intensity of radio waves received by the receiving means using the second antenna. The control means can thus control the receiving means based on a third intensity of radio waves corrected from the first intensity of radio waves based on the relative antenna gain. As a result, even when an antenna having any given antenna gain is connected, the radio communication device can specify such an antenna gain.

Preferably, the receiving means includes means for receiving radio waves using the second antenna only when an intensity of radio waves is measured.

More specifically, the receiving means can receive radio waves using the second antenna only when an intensity of radio waves is measured. The control means can control the receiving means based on a third intensity of radio waves corrected from the first intensity of radio waves based on the relative antenna gain. The receiving means is thus controlled based on the third intensity of radio waves. As a result, even when an antenna having any given antenna gain is connected, the radio communication device can specify such an antenna gain, and except when an intensity of radio waves is measured, it can receive radio waves more appropriately.

Preferably, the receiving means includes means for receiving radio waves representative of information using only the first antenna.

More specifically, the receiving means can receive radio waves representative of information using only the first antenna. The control means can control the receiving means based on the third intensity of radio waves corrected from the first intensity of radio waves based on the relative antenna gain. The receiving means thus receives radio waves representative of information under the control based on the third intensity of radio waves. As a result, even when an antenna having any given antenna gain is connected, the radio communication device can specify such an antenna gain, and when radio waves representative of information are received, it can receive radio waves more accurately.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

In the following, the embodiments of the present invention will be described with reference to the figures. In the following description, the same parts will be denoted with the same reference characters. Their designations and functions are also the same. Therefore, detailed description thereof will not be repeated.

First Embodiment

In the following, a radio communication device 10 in accordance with a first embodiment of the present invention will be described.

Figure 1:
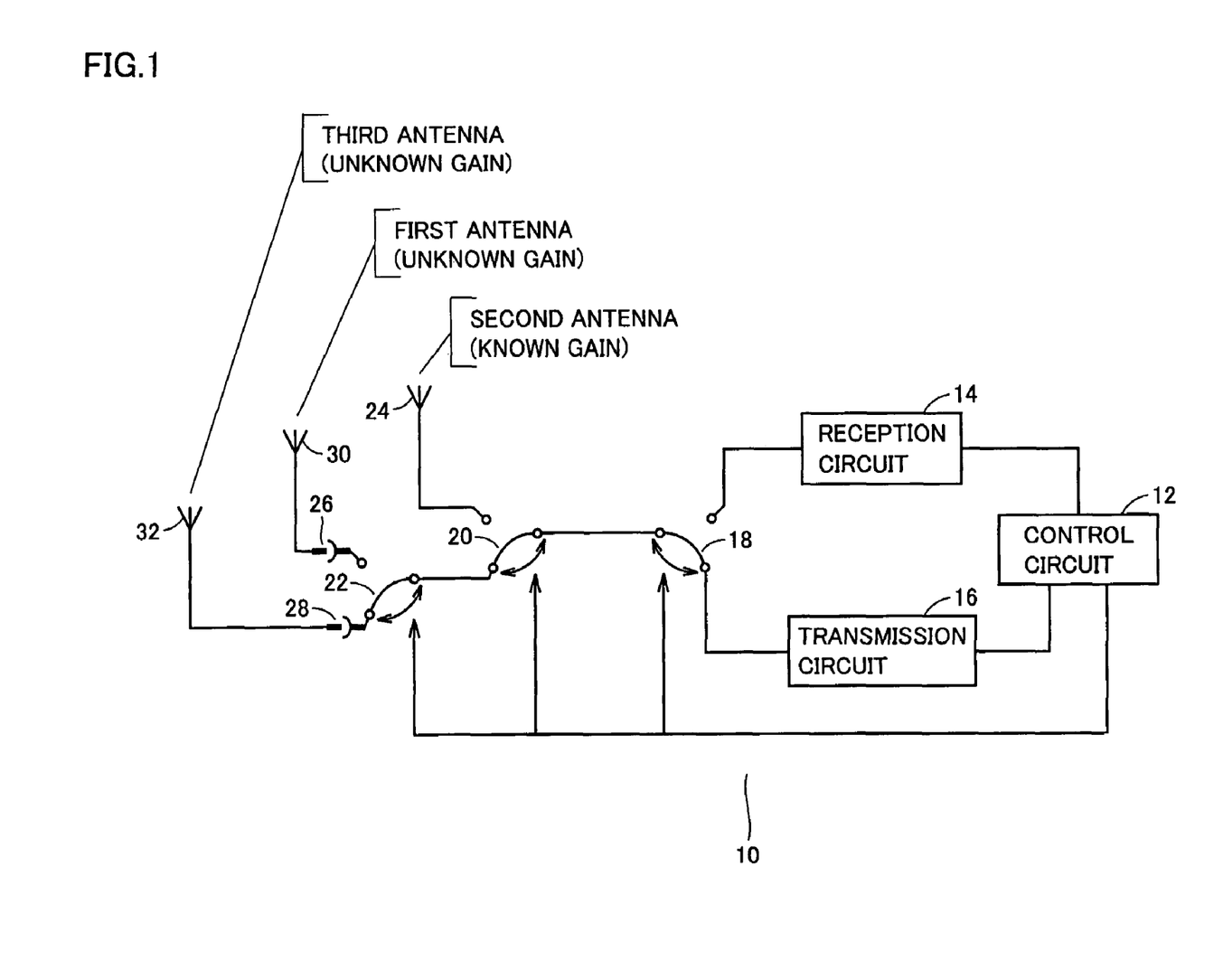
FIG. 1 is an overall configuration diagram of a radio communication device in accordance with a first embodiment of the present invention.

Referring to FIG. 1, radio communication device 10 in accordance with this embodiment includes a control circuit 12, a reception circuit 14, a transmission circuit 16, a switch 18, a gain measurement switch 20, a diversity switch 22, a second antenna 24, a first connector 26, a second connector 28, a first antenna 30, and a third antenna 32. Control circuit 12 is responsible for the following functions. The first function is to control the components of radio communication device 10 including the switches. The second function is to specify an antenna gain of an antenna connected to radio communication device 10. Reception circuit 14 receives radio waves using an antenna. Reception circuit 14 carries out the following processes based on the received radio waves. The first process is to receive information through demodulation. The second process is to measure a signal level of a received signal. Transmission circuit 16 transmits as radio waves information to be transmitted using an antenna. Switch 18 switches a connection destination of the antenna between reception circuit 14 and transmission circuit 16 under the control of control circuit 12. Gain measurement switch 20 switches the connection between second antenna 24 and the other antennas under the control of control circuit 12. Diversity switch 22 switches the connection between first connector 26 and second connector 28 under the control of control circuit 12. Second antenna 24 is an antenna fixed to radio communication device 10. Second antenna 24 is an antenna to be used only to measure intensity of radio waves. The intensity of radio waves is measured in order to specify an antenna gain. First connector 26 and second connector 28 are terminals for connecting antennas having any given antenna gains. First antenna 30 and third antenna 32 are connected to first connector 26 and second connector 28, respectively. These antennas have any given antenna gains. These antennas can be removably attached to first connector 26 and second connector 28 freely.

Figure 2:
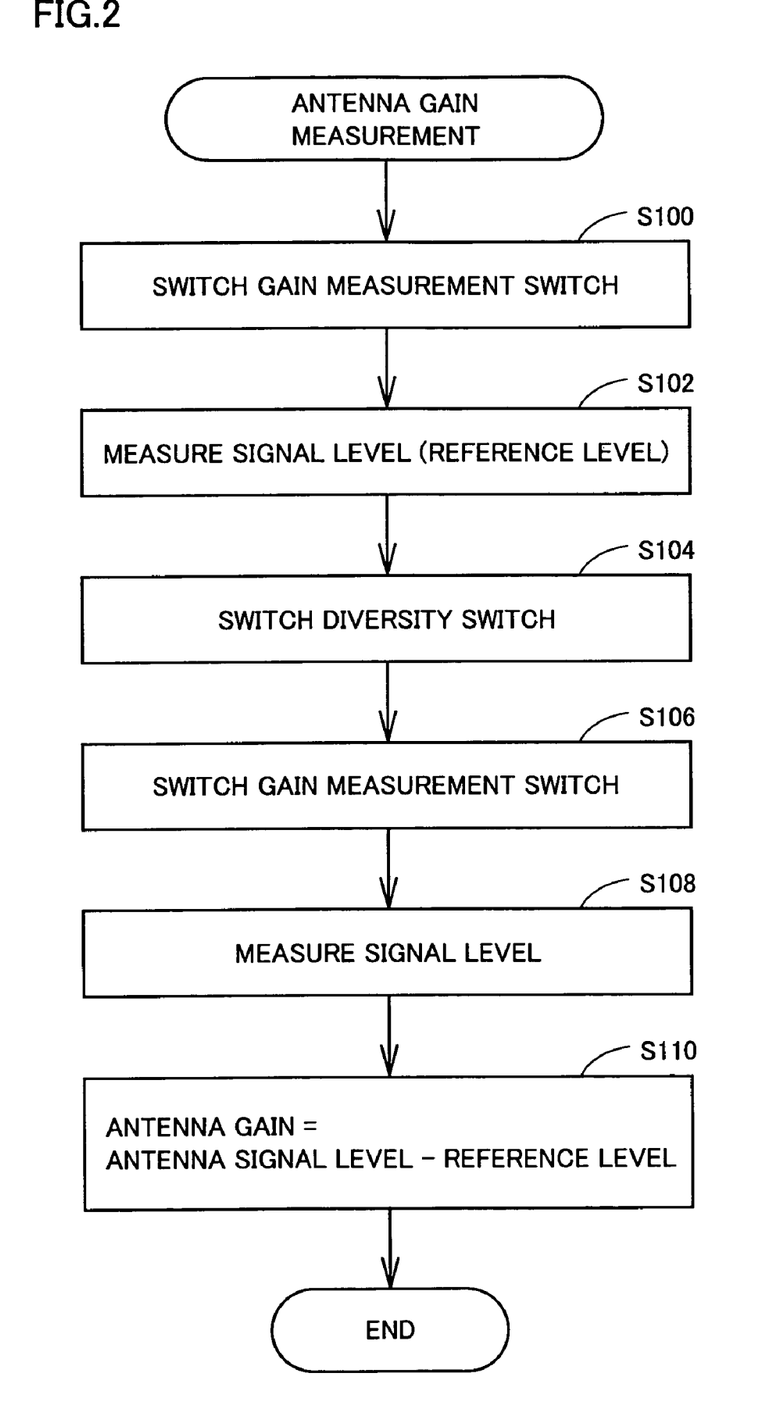
FIG. 2 is a flow chart showing a control procedure of a process of measuring a relative antenna gain of the radio communication device in accordance with the first embodiment of the present invention.

Referring to FIG. 2, a program executed in radio communication device 10 has the following control structure with respect to a process of measuring a relative antenna gain of an antenna.

At step (abbreviated as S hereinafter) 100, control circuit 12 controls gain measurement switch 20. Control circuit 12 controls switch 18. Second antenna 24 is thus connected to reception circuit 14.

At S102, reception circuit 14 receives radio waves using second antenna 24. Reception circuit 14 measures a signal level of radio waves received using the second antenna. Reception circuit 14 sets that signal level as a reference level.

At S104, control circuit 12 switches diversity switch 22. Thus, one of first antenna 30 and third antenna 32 is selected. At S106, control circuit 12 switches gain measurement switch 20. As a result, the antenna as selected at S104 (referred to as "selected antenna" hereinafter) is connected to reception circuit 14.

At S108, reception circuit 14 measures radio waves using the selected antenna. Reception circuit 14 measures a signal level of the measured radio waves. Reception circuit 14 sets the measured signal level as a signal level of the selected antenna.

At S110, control circuit 12 obtains a difference between the reference level of second antenna 24 and the signal level of the selected antenna as measured by the reception circuit. Control circuit 12 sets this difference as a relative antenna gain of the selected antenna.

Figure 3:
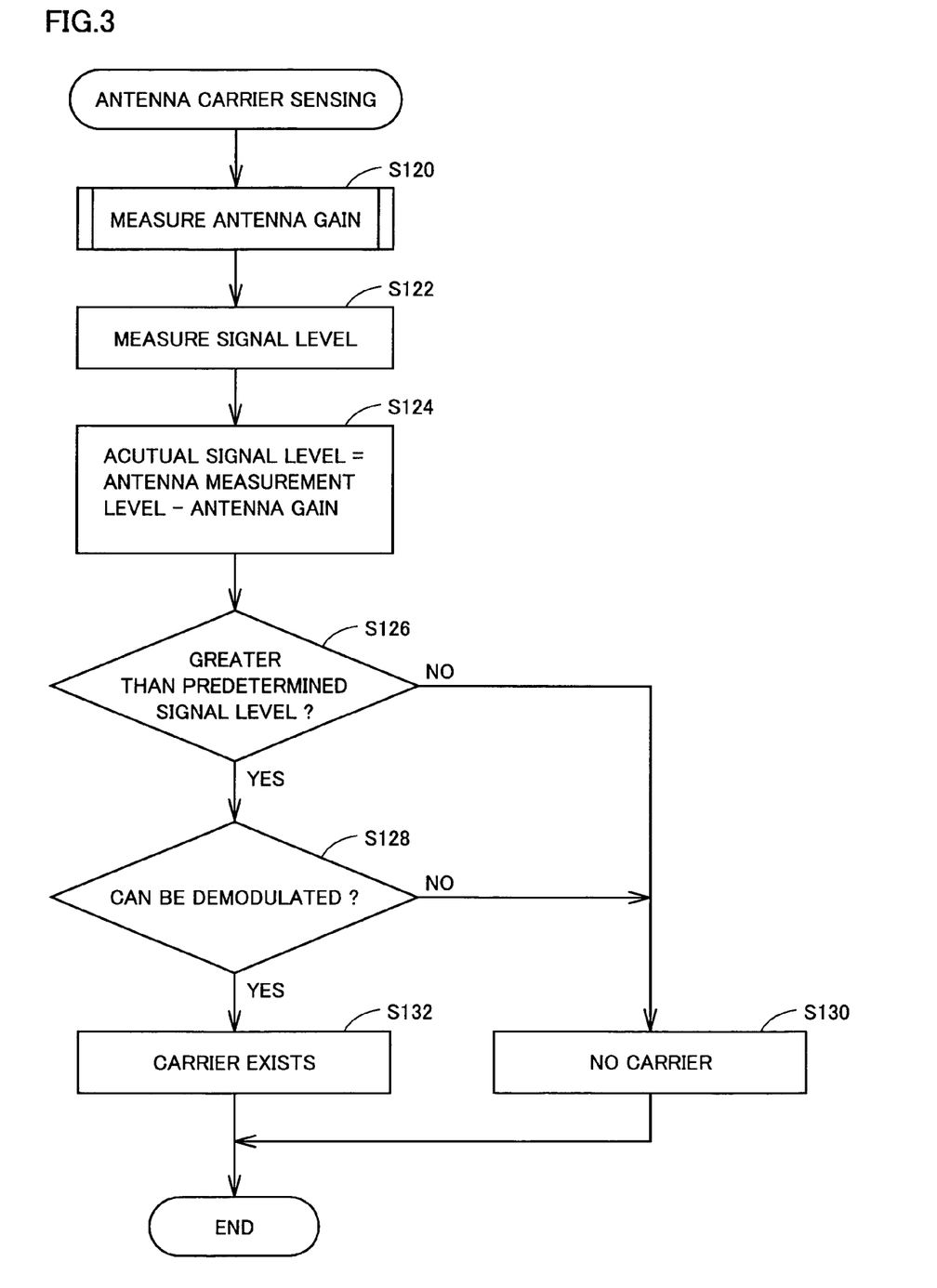
FIG. 3 is a flow chart showing a control procedure of a carrier sensing process of the radio communication device in accordance with the first embodiment of the present invention.

Referring to FIG. 3, a program executed in radio communication device 10 has the following structure with regard to a carrier sensing process.

At S120, control circuit 12 uses reception circuit 14 to measure an antenna gain of a selected antenna. This process is similar to a series of processes as illustrated in connection with FIG. 2.

At S122, reception circuit 14 receives radio waves using the selected antenna. Reception circuit 14 measures a signal level based on the received radio waves. Reception circuit 14 sets that signal level as a signal level of the selected antenna.

At S124, control circuit 12 uses the signal level of the selected antenna measured by reception circuit 14 to find an actual signal level of the radio waves received by the selected antenna, according to the following formula. Therefore, the signal level of the radio waves received by the selected antenna is corrected.

(the actual signal level)=(the signal level of the
selected antenna)−(the antenna gain of the
selected antenna)

At S126, control circuit 12 determines whether the signal level of the radio waves received by the selected antenna is greater than a predetermined signal level stored in control circuit 12 in advance. If it is determined that the signal level is greater than the predetermined signal level (YES at S126), the process will proceed to S128. If not (NO at S126), the process will proceed to S130.

At S128, control circuit 12 determines whether the signal received by reception circuit 14 can be demodulated. If it is determined that it can be demodulated (YES at S128), the process will proceed to S132. If not (NO at 8128), the process will proceed to S130. At S130, control circuit 12 sets an internal flag (not shown) at a value representing that there is no carrier. At S132, control circuit 12 sets the internal flag at a value representing that there is a carrier.

Figure 4:
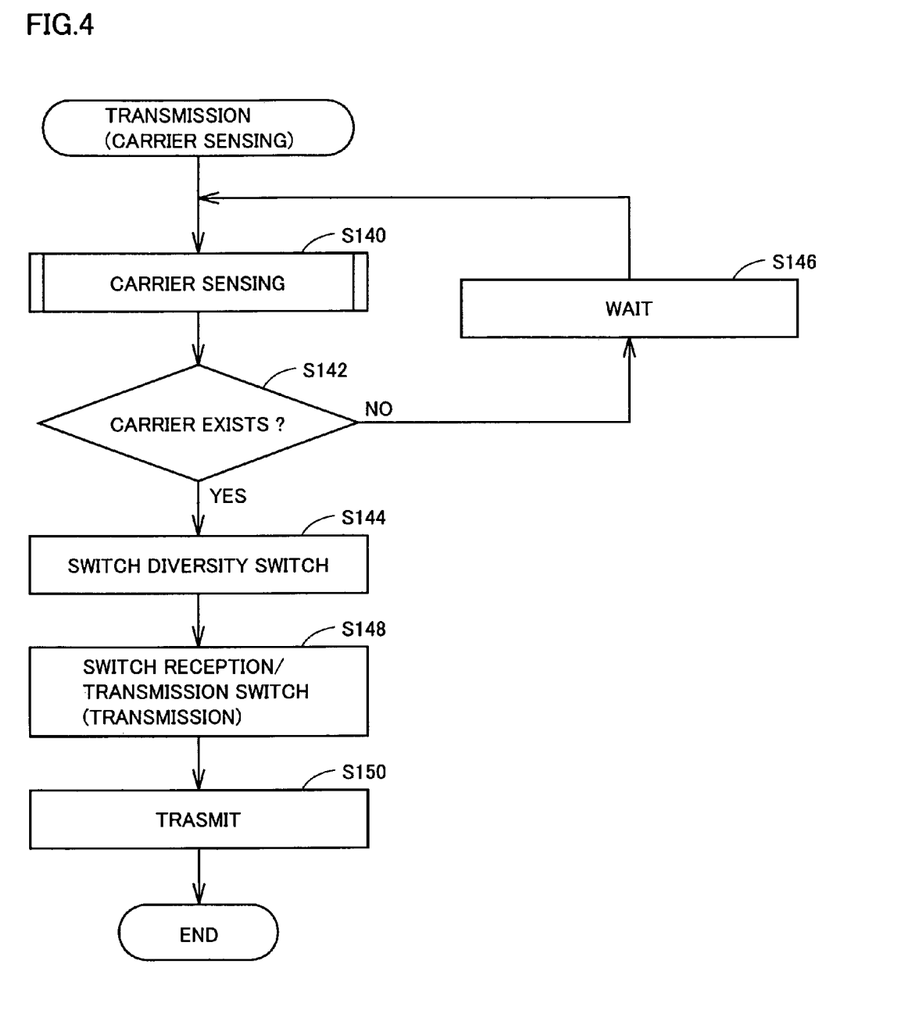
FIG. 4 is a flow chart showing a control procedure of a transmission process of the radio communication device in accordance with the first embodiment of the present invention.

Referring to FIG. 4, a program executed in radio communication device 10 has the following control structure with regard to a transmission process.

At S140, control circuit 12 carries out a carrier sensing process for the selected antenna. This process is the same as a series of processes as illustrated in connection with FIG. 3. process.

At S142, control circuit 12 determines whether the value of the flag is a value representing that there is a carrier. If it is determined that it is a value representing that there is a carrier (YES at S142), the process will proceed to S144. If not (NO at S142), the process will proceed to S146.

At S144, control circuit 12 controls diversity switch 22 to be connected to the selected antenna. At S146, control circuit 12 stops the operation for any given time period that is preset.

At S148, control circuit 12 switches switch 18 such that the selected antenna is connected to transmission circuit 16. At S150, transmission circuit 16 modulates the signal based on information to be transmitted and transmits radio waves using the antenna.

An operation of radio communication device 10 based on the structure and flow charts as described above will be described.

A series of processes in transmitting information using first antenna 30 having an unknown antenna gain will be described.

Control circuit 12 switches gain measurement switch 20 to connect second antenna 24 (S100). Once gain measurement switch 20 is switched, reception circuit 14 measures a signal level of second antenna 24 (S102). This signal level is set as a reference level. Upon measurement of the reference level, control circuit 12 switches diversity switch 22 such that first antenna 30 is connected (S104). Upon switching of diversity switch 22, control circuit 12 switches gain measurement switch 20 such that first antenna 30 is connected (S106). Upon switching of gain measurement switch 20, reception circuit 14 measures a signal level using first antenna 30 (S108). Upon measurement of the signal level of first antenna 30, control circuit 12 specifies the gain of first antenna 30 (S110).

Upon specification of the gain of first antenna 30, reception circuit 14 measures a signal level of first antenna 30 (S122). Upon measurement of the signal level of first antenna 30, control circuit 12 corrects the signal level of first antenna 30 (S124). Upon correction of the signal level of first antenna 30, control circuit 12 determines whether the corrected signal level is greater than a predetermined signal level (S126). In this case, as the corrected signal level is greater than the predetermined signal level (YES at S126), control circuit 12 determines whether the received signal can be demodulated (S128). Initially, it is determined that the received signal cannot be demodulated (NO at S128), and therefore control circuit 12 sets the internal flag to a value representing that there is no carrier (S130). Since the internal flag is set at a value representing that there is no carrier (NO at S142), control circuit 12 stops the operation for a predetermined time period and waits (S146).

When the predetermined time period has passed, the components of radio communication device 10 undergo the processes at S120 to S126, and control circuit 12 determines whether the received signal can be demodulated (S128). In this case, as it is determined that the received signal can be demodulated (YES at S128), control circuit 12 sets the internal flag at a value representing that there is a carrier (S132). Since the internal flag is set at a value representing that there is a carrier (YES at S142), control circuit 12 controls diversity switch 22 to be connected to first antenna 30 (S144). Upon control of diversity switch 22, control circuit 12 controls switch 18 (S148). Upon control of switch 18, transmission circuit 16 modulates the signal and transmits radio waves (S150).

In this manner, radio communication device 10 in the present embodiment can control the reception circuit and the transmission circuit, based on the intensity of radio waves corrected based on the relative antenna gain. Therefore, even when a plurality of antennas having arbitrary antenna gains are connected, a proper operation such as carrier sensing can be ensured. This is because radio communication device 10 can specify a relative antenna gain of the antenna. As a result, such a radio communication device can be provided that can receive and transmit radio waves appropriately by easily specifying an arbitrary antenna gain, even when a plurality of antennas having such arbitrary antenna gains are connected.

It is noted that first antenna 30 and third antenna 32 may be fixed to radio communication device 10 in an unremovable manner by first connector 26 and second connector 28.

Furthermore, at S110, a relative antenna gain may not be limited to a difference between the signal level and the reference level. For example, their difference may be multiplied by a constant. It may be a value obtained by substituting their difference for a function. It may be a value obtained by directly substituting their values for functions.

Second Embodiment

In the following, radio communication device 10 in accordance with a second embodiment of the present invention will be described.

The hardware structure of radio communication device 10 in accordance with the present embodiment is the same as the first embodiment above. The functions are also the same. Therefore, the description thereof will not be repeated here.

Figure 5:
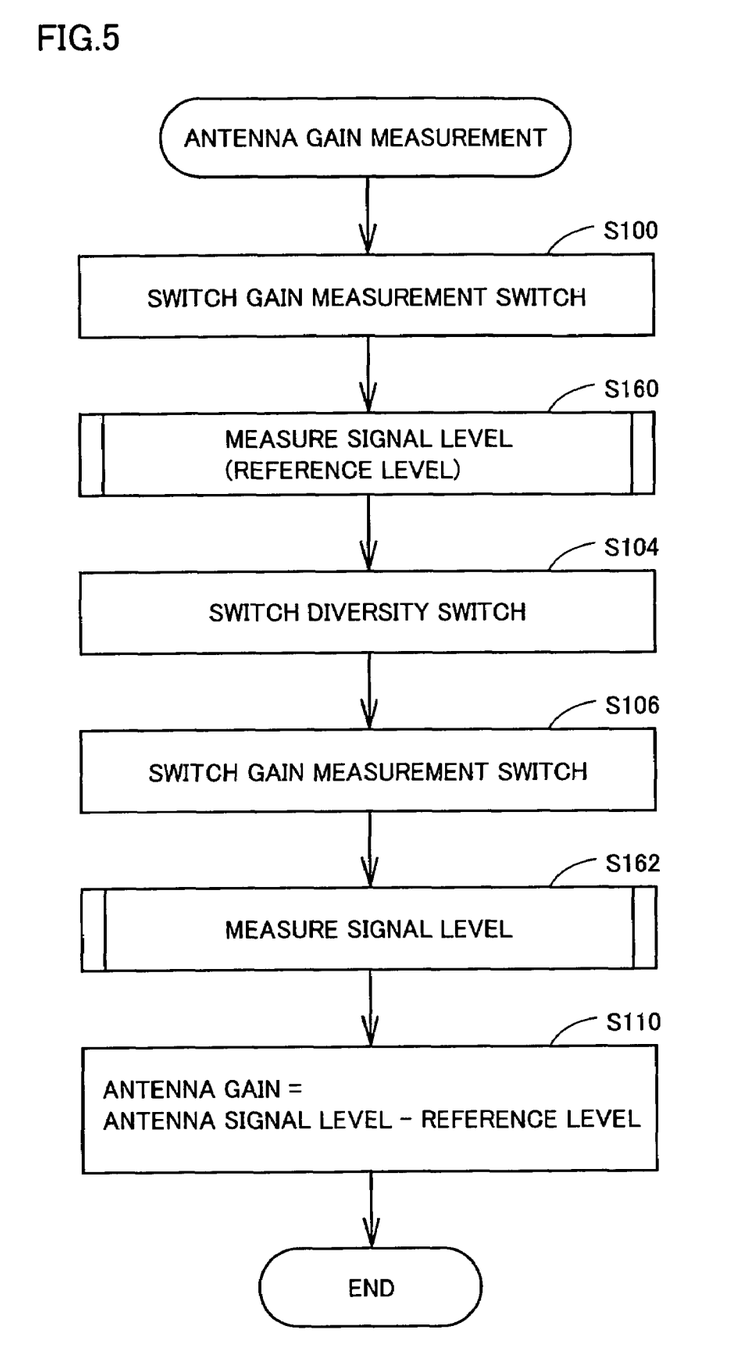
FIG. 5 is a flow chart showing a control procedure of a process of measuring a relative antenna gain of the radio communication device in accordance with a second embodiment of the present invention.

Referring to FIG. 5, a program executed in radio communication device 10 has the following control structure with regard to a process of measuring a relative antenna gain. It is noted that, in the flow chart shown in FIG. 5, the processes shown in FIG. 2 as illustrated above are denoted with the same step numerals. The processes are also the same. Therefore, the detailed description thereof will not be repeated here.

At S160, reception circuit 14 measures a signal level of second antenna 24. The processes here are the same as a series of processes in FIG. 6, which will be described hereinafter. At S162, reception circuit 14 measures a signal level of a selected antenna. The processes here are also the same as a series of processes in FIG. 6, which will be described hereinafter.

Figure 6:
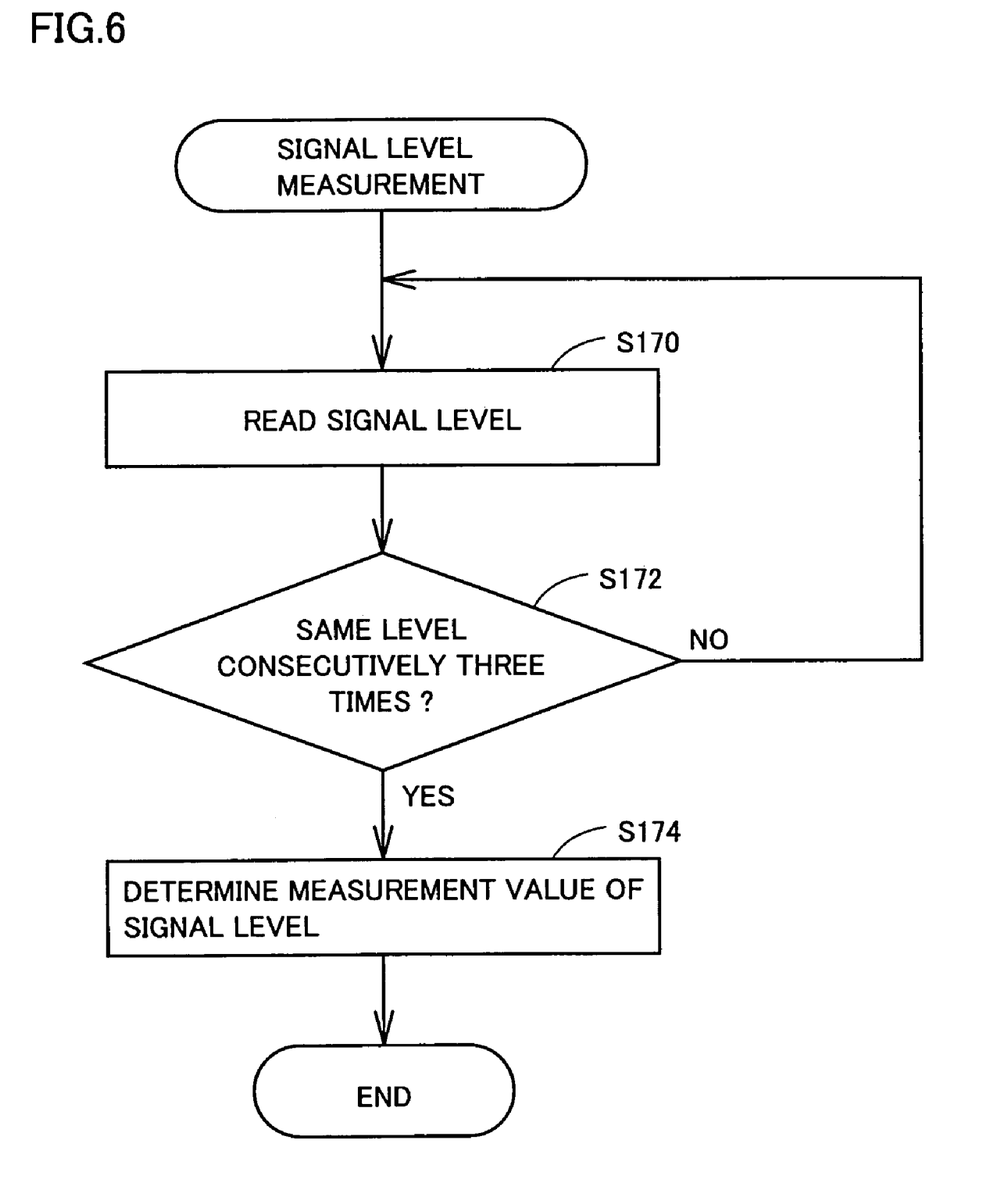
FIG. 6 is a flow chart showing a control procedure of a process of measuring a signal level of the radio communication device in accordance with the second embodiment of the present invention.

Referring to FIG. 6, a program executed in radio communication device 10 has the following control structure with regard to a signal level measuring process.

At S170, reception circuit 14 reads a signal level of a selected antenna. At S172, reception circuit 14 determines whether the signal levels of the received signals are at the same level consecutively three times. If it is determined that they are at the same level consecutively three times (YES at S172), the process will proceed to S174. If not (NO at S172), the process will proceed to S170. In this case, if a variation of the measured signal level is within "±3" dB as compared with the last measured value, the received signal level is considered as being at the same level.

At S174, reception circuit 14 determines that the measured signal level is the signal level of that antenna. If the measured signal levels vary within the range of "±3" dB, reception circuit 14 considers an average value of these measured values as the signal level.

An operation of radio communication device 10 with first antenna 30 as the selected antenna will be described based on the structure and flowcharts as described above.

When gain measurement switch 20 is switched over, reception circuit 14 uses first antenna 30 to measure its signal level (S170). Upon measuring the signal level, reception circuit 14 determines whether the measured signal levels are at the same level consecutively three times (S172). If it is determined that they are at the same level consecutively three times (YES at S172), reception circuit 14 determines a measurement value of the received signal level (S174).

Upon determination of the signal level, control circuit 12 switches each switch through the processes at S104 and S106. Once the switch is switched, reception circuit 14 measures a signal level of first antenna 30 (S162). Upon measurement of the signal level of first antenna 30, information is transmitted through the processes from S110 to S150.

In this manner, the radio communication device in the present embodiment can carry out the process of transmitting information under the control based on the intensity of radio waves. As a result, such a radio communication device can be provided that can specify an arbitrary antenna gain even when an antenna having such an arbitrary antenna gain is connected, and that can receive radio waves more appropriately and reliably when radio waves representative of information are received.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A radio communication device comprising:
    a connector to which a first antenna having any given antenna gain is connectable;
    a second antenna having a known antenna gain;
    a receiver for receiving radio waves from said first and second antennas;
    a control circuit for specifying a relative antenna gain of said first antenna with respect to said second antenna using a first intensity of radio waves received by said receiver using said first antenna connected to said connector and a second intensity of radio waves received by said receiver using said second antenna, wherein
    said control circuit controls said receiver based on a third intensity of radio waves that is corrected from said first intensity of radio waves based on said relative antenna gain.

2. The radio communication device according to claim 1, wherein said receiver receives radio waves using said second antenna only when an intensity of radio waves is measured.

3. The radio communication device according to claim 1, wherein said receiver receives radio waves representative of information using only said first antenna.

4. The radio communication device according to claim 1, wherein the second antenna is an antenna used only to measure intensity of radio waves.

* * * * *